United States Patent [19]
Hekstra et al.

[11] Patent Number: 5,596,321
[45] Date of Patent: Jan. 21, 1997

[54] SYSTEM COMPRISING A FIRST ENCODER FOR CODING A FIRST DIGITAL SIGNAL, A SECOND ENCODER FOR CODING A SECOND DIGITAL SIGNAL AND AT LEAST ONE DECODER FOR DECODING CODED DIGITAL SIGNALS, AND CODER AND DECODER FOR USE IN THE SYSTEM

[75] Inventors: Andries P. Hekstra, Woubrugge; Arian Koster, Mydrecht, both of Netherlands

[73] Assignee: Koninklijke PTT Nederland N.V., Groningen, Netherlands

[21] Appl. No.: 119,736

[22] Filed: Sep. 10, 1993

[30] Foreign Application Priority Data

Sep. 14, 1992 [NL] Netherlands ............................ 9201593

[51] Int. Cl.$^6$ .................................................. H04N 11/02
[52] U.S. Cl. ............................ 341/76; 348/409; 348/415
[58] Field of Search ................................. 341/50, 51, 67, 341/76; 348/400–402, 409–413, 415, 416

[56] References Cited

U.S. PATENT DOCUMENTS

| | | | |
|---|---|---|---|
| 4,518,950 | 5/1985 | Petr ............................................ | 341/76 |
| 4,549,304 | 10/1985 | Weirich et al. ............................ | 375/27 |
| 4,958,226 | 9/1990 | Haskell et al. ............................ | 358/136 |
| 4,999,705 | 3/1991 | Puri ............................................ | 358/136 |
| 5,063,443 | 11/1991 | Okajima et al. ........................... | 358/133 |
| 5,068,724 | 11/1991 | Krause et al. ............................. | 358/133 |
| 5,173,773 | 12/1992 | Ueda et al. ................................. | 358/136 |
| 5,253,058 | 10/1993 | Gharavi ..................................... | 358/136 |

FOREIGN PATENT DOCUMENTS

| | | |
|---|---|---|
| 0222918 | 5/1987 | European Pat. Off. . |
| 0314356 | 5/1989 | European Pat. Off. . |
| 4178095 | 6/1992 | Japan . |
| 9206563 | 4/1992 | WIPO . |

OTHER PUBLICATIONS

Vandendorpe, "Hierarchial Transform and Subband Coding of Video Signals", signal Processing: Image Communication 4, No. 3, Jun. 1992 pp. 245–262.

Parke, "Coded Representation of Picture and Audio Information", ISO–IEC/JTC1/SC29/WG11/MPEG92/291, 1992, pp. 1–9.

Tourtier et al., "Motion Compensated Subband Coding Schemes for Compatible High Definition TV Coding", Signal Processing: Image Communication 4, vol. 4, No. 4/5, Aug. 1992 pp. 325–344.

Perkins, "Data Compression of Stereopairs", IEEE Transaction on Communications, vol. 40, No. 4, Apr. 1992, pp. 684–696.

*Primary Examiner*—Marc S. Hoff
*Attorney, Agent, or Firm*—Peter L. Michaelson

[57] ABSTRACT

Known systems based on stereoscopic video coding and video decoding code with inadequate efficiency because the left-hand picture and the right-hand picture are coded and decoded independently of one another by means of the encoders present in the system. As a result of providing one encoder with switching means to which a signal representing the left-hand picture and a signal representing the right-hand picture are fed, said encoder is able to base the prediction either on the left-hand picture or the right-hand picture, and this improves the prediction and, consequently, the efficiency of the coding. As a result of designing the switching means, according to one embodiment, for the adjustment of the ratio of the signal representing the left-hand picture and the signal representing the right-hand picture and for the subsequent addition of the two adjusted signals, a still greater advantage is achieved in the prediction with the correct ratio, and this results in a further improvement in the efficiency of the (total) coding.

17 Claims, 3 Drawing Sheets

SYSTEM COMPRISING A FIRST ENCODER FOR CODING A FIRST DIGITAL SIGNAL, A SECOND ENCODER FOR CODING A SECOND DIGITAL SIGNAL AND AT LEAST ONE DECODER FOR DECODING CODED DIGITAL SIGNALS, AND CODER AND DECODER FOR USE IN THE SYSTEM

BACKGROUND OF THE INVENTION

The invention relates to a system comprising a first encoder for coding a first digital signal, a second encoder for coding a second digital signal and at least one decoder for decoding coded digital signals, which first encoder is provided with a first input for receiving the first digital signal, first data processing means, coupled to the first input, for generating a first coded digital signal, first encoder feedback means for feeding back at least a section of the first data processing means, which first encoder feedback means comprise first encoder memory means, which second encoder is provided with a second input for receiving the second digital signal, second data processing means, coupled to the second input, for generating a second coded digital signal, and second encoder feedback means for feeding back at least a section of the second data processing means, which second encoder feedback means comprise second encoder memory means, and which decoder is provided with first data reprocessing means for processing a first coded digital signal, first decoder memory means which are coupled to the first data reprocessing means, second data reprocessing means for processing a second coded digital signal, and second decoder memory means which are coupled to the second data reprocessing means.

Such a system is disclosed in "Data Compression of Stereopairs", by Michael G. Perkins, IEEE Transactions on Communications, Vol. 40, No. 4, April 1992, pages 684–696, in particular FIG. 3. The first encoder comprises the first input for receiving the first digital signal to be coded, such as, for example, a left-hand television signal made up of picture elements (pixels or pels), and the first data processing means, coupled to the first input, for generating the first coded digital signal. The first encoder furthermore comprises the first encoder feedback means for feeding back at least a section of the first data processing means in order to make the coding proceed more efficiently. The first encoder feedback means comprise the first encoder memory means. The second encoder comprises the second input for receiving the second digital signal to be coded, such as, for example, a right-hand television signal made up of picture elements (pixels or pels), and the second data processing means, coupled to the second input, for generating the second coded digital signal. The second encoder furthermore comprises the second encoder feedback means for feeding back at least a section of the second data processing means in order to make the coding proceed more efficiently. The second encoder feedback means comprise the second encoder memory means. Such first and second encoders are generally known.

Such a system provided with the first encoder comprising the first data processing means and the second encoder comprising the second data processing means is made up of two parts: the first data processing means generate the first coded digital signal, which represents the left-hand television picture, and the second data processing means generate the second coded digital signal, which represents the right-hand television picture. Both signals are then passed, by means of multiplexing and demultiplexing, to the decoder, which comprises the first data reprocessing means for processing a first coded digital signal, the first decoder memory means, which are coupled to the first data reprocessing means, the second data reprocessing means for processing a second coded digital signal, and the second decoder memory means, which are coupled to the second data reprocessing means. Like the encoders, such a decoder is generally known.

Such a known system has the disadvantage that it codes with inadequate efficiency.

SUMMARY OF THE INVENTION

The object of the invention is to provide a system of the type mentioned in the preamble which codes more efficiently.

For this purpose, the system according to the invention has the characteristic that the first encoder is provided with encoder switching means, of which a main contact is coupled to the first input, of which a first switch contact is coupled to first encoder memory means, and of which a second switch contact is coupled to the second encoder memory means, the decoder being provided with decoder switching means, of which a main contact is coupled to the first data reprocessing means, of which a first switch contact is coupled to the first decoder memory means, and of which a second switch contact is coupled to the second decoder memory means.

In this arrangement, the encoder switching means and the decoder switching means are designed, for example, as switch-over means, that is to say the main contact is connected through either to the first switch contact or to the second switch contact. If, depending on a "system controller", the main contact of the encoder switching means is connected through to the first switch contact, the left-hand television picture stored in the first encoder memory means is being used to predict the new left-hand television picture. If, depending on the "system controller", the main contact of the encoder switching means is connected through to the second switching contact, the right-hand television picture (for example, stored in the second encoder memory means) is being used to predict the new left-hand television picture. The information which is necessary for this and originates from the "system controller" is also passed to the decoder by means of multiplexing and demultiplexing so that the decoder switching means are in a synchronous state with the encoder switching means. As a result of using the encoder switching means and the decoder switching means, the prediction to be made in the first encoder via the first encoder feedback means is improved since the "system controller" chooses the most suitable basis (the left-hand or the right-hand television picture) for the prediction. The improvement of the prediction in the first encoder results in an improvement of the efficiency of the coding in the first encoder and, consequently, in an improvement of the efficiency of the coding of the entire system.

The invention is based on the insight that the efficiency of the coding can generally be improved by basing the prediction of the new left-hand television picture on the most suitable preceding television picture (the signal which is present at the first switch contact and represents the preceding left-hand television picture or the signal which is present at the second switch contact and represents the preceding right-hand television picture), and that this can be achieved in a simple manner by encoder switching means to be provided in the encoder and decoder switching means to be provided in the decoder.

A first embodiment of the system according to the invention has the characteristic that the encoder switching means and the decoder switching means are each designed for the adjustment of a ratio of signals present at the first switch contact and second switch contact and for the combination of the signals adjusted in this way.

If the encoder switching means and the decoder switching means each adjust the ratio of the signals present at the first switch contact and second switch contact depending on the system controller and combine these adjusted signals, a further improvement of the prediction is achieved with the correct ratio, which is, of course, dependent on the picture, and this results in a further improvement of the efficiency of the coding of the entire system.

A second embodiment of the system according to the invention has the characteristic that the encoder switching means and the decoder switching means are each designed for the multiplication of the signal present at the first switch contact by the value x and for the multiplication of the signal present at the second switch contact by the value 1−x, where $0 \leq x \leq 1$.

Because the signals present at the first and second switch contacts are digital and are presented in the form of numbers, both signals can be multiplied in a manner which is simple for the person skilled in the art by x and 1−x (where $0 \leq x \leq 1$), respectively, and they can then be added. Many variations on this are conceivable, such as multiplying by y and 100−y (where $0 \leq y \leq 100$), respectively, and then dividing the summed signal by the value 100, which, of course, ultimately produces the same result if it is true that y =100 x. In this way, by the adjustment, depending on the system controller, of the value of x, it is possible to determine to what extent the preceding left-hand television picture and the preceding right-hand television picture contribute to the prediction of the new left-hand television picture.

A third embodiment of the system according to the invention has the characteristic that the first encoder is provided with encoder prediction means coupled to the second encoder and having an output for generating an encoder prediction signal, which output is coupled to the second switch contact of the encoder switching means, the decoder being provided with decoder compensation means having an output for generating a decoder compensation signal, which output is coupled to the second switch contact of the decoder switching means.

As a result of providing the system with the encoder prediction means to which, for example, the preceding right-hand television picture stored in the second encoder memory means and the new left-hand television picture present at the first input are fed, which encoder prediction means perform a picture estimation/compensation (disparity estimator/compensator), and as a result of feeding the signal obtained in this way to the second switch contact, the prediction in the first encoder is again improved further, and this results in yet a further improvement of the efficiency of the coding. In this case, the decoder is provided with decoder compensation means which are controlled by a vector signal originating from the encoder prediction means by means of multiplexing and demultiplexing.

A fourth embodiment of the system according to the invention has the characteristic that the first encoder is provided with first encoder movement prediction means, situated in series with the first encoder memory means, the second encoder being provided with second encoder movement prediction means, situated in series with the second encoder memory means, and the decoder being provided with first decoder movement compensation means, situated in series with the first decoder memory means, and second decoder movement compensation means, situated in series with the second decoder memory means.

As a result of installing in the encoder first encoder movement prediction means in series with the first encoder memory means and second encoder movement prediction means in series with the second encoder memory means and of installing in the decoder first decoder movement compensation means between the first switch contact and the first decoder memory means and of installing second decoder movement compensation means in series with the second decoder memory means, a system is obtained which codes with yet higher efficiency because said system takes account of the movements of the picture content in coding and decoding various picture elements. For this purpose, the encoder movement prediction means each generate vector signals which are passed by means of multiplexing and demultiplexing to the decoder, in which one of the vector signals or a combination of both vector signals is used to control the decoder movement compensation means.

The invention furthermore relates to an encoder for use in the system according to the invention, comprising an input for receiving the digital signal, data processing means, coupled to the input, for generating a coded digital signal, encoder feedback means for feeding back at least a section of the data processing means, which encoder feedback means comprise encoder memory means.

The encoder according to the invention has the characteristic that the encoder is provided with encoder switching means, of which a main contact is coupled to the input, of which a first switch contact is coupled to the encoder memory means, and of which a second switch contact can be coupled to a further encoder.

A first embodiment of the encoder according to the invention has the characteristic that the encoder switching means are designed for the adjustment of a ratio of signals present at the first switch contact and second switch contact and for the combination of the signals adjusted in this way.

A second embodiment of the encoder according to the invention has the characteristic that the encoder switching means are designed for the multiplication of the signal present at the first switch contact by the value x and for the multiplication of the signal present at the second switch contact by the value 1−x, where $0 \leq x \leq 1$.

A third embodiment of the encoder according to the invention has the characteristic that the encoder is provided with encoder prediction means which can be coupled to a further encoder and have an output for generating an encoder prediction signal, which output is coupled to the second switch contact of the encoder switching means.

A fourth embodiment of the encoder according to the invention has the characteristic that the encoder is provided with encoder movement prediction means, situated in series with the encoder memory means.

The invention also furthermore relates to a decoder for use in the system according to the invention, comprising first data reprocessing means for processing a first coded digital signal, first decoder memory means which are coupled to the first data reprocessing means, second data reprocessing means for processing a second coded digital signal, and second decoder memory means which are coupled to the second data reprocessing means.

The decoder according to the invention has the characteristic that the decoder is provided with decoder switching means, of which a main contact is coupled to the first data reprocessing means, of which a first switch contact is coupled to the first decoder memory means, and of which a second switch contact is coupled to the second decoder memory means.

A first embodiment of the decoder according to the invention has the characteristic that the decoder switching means are designed for the adjustment of a ratio of signals present at the first switch contact and second switch contact and for the combination of the signals adjusted in this way.

A second embodiment of the decoder according to the invention has the characteristic that the decoder switching means are designed for the multiplication of the signal present at the first switch contact by the value x and for the multiplication of the signal present at the second switch contact by the value 1−x, where $0 \leq x \leq 1$.

A third embodiment of the decoder according to the invention has the characteristic that the decoder is provided with decoder compensation means having an output for generating a decoder compensation signal, which output is coupled to the second switch contact of the decoder switching means.

A fourth embodiment of the decoder according to the invention has the characteristic that the decoder is provided with first decoder movement compensation means, situated in series with the first decoder memory means, and second decoder movement compensation means, situated in series with the second decoder memory means.

It is pointed out that an encoder having switch-over means and a decoder having switch-over means are known per se in "Coded representation of picture and audio information", "TM1 Compatibility Experiments", by I. Parke, ISO-IEC/JTC1/SC29/WG11, MPEG92/291. In these are, however, an encoder and a decoder which function on the basis of layered coding/decoding and which each mutually couple their layers, which operate with different resolutions, via switch-over means. For example, in the encoder a prediction is made in this arrangement on the basis of either an instantaneous picture element having low resolution or a preceding picture element, corresponding thereto, having high resolution. The last-mentioned publication does not therefore disclose either mutually coupling different encoders, which receive and code different-(left-hand and right-hand) signals, via the encoder switching means in order to make the coding of the entire system proceed more efficiently, or designing the switching means in a first embodiment for the adjustment of a ratio of signals present at the first switch contact and second switch contact and for the combination of the signals adjusted in this way in order to make the coding of the entire system proceed still more efficiently.

References

"Data Compression of Stereopairs", by Michael G. Perkins, IEEE Transactions on Communications, Vol. 40, No. 4, April 1992, pages 684–696

"Coded representation of picture and audio information", "TM1 Compatibility Experiments", by I. Parke, ISO-IEC/JTC1/SC29/WG11, MPEG92/291

Exemplary embodiment

The invention will be explained in greater detail by reference to an exemplary embodiment shown in the figures.

Figure 1A:
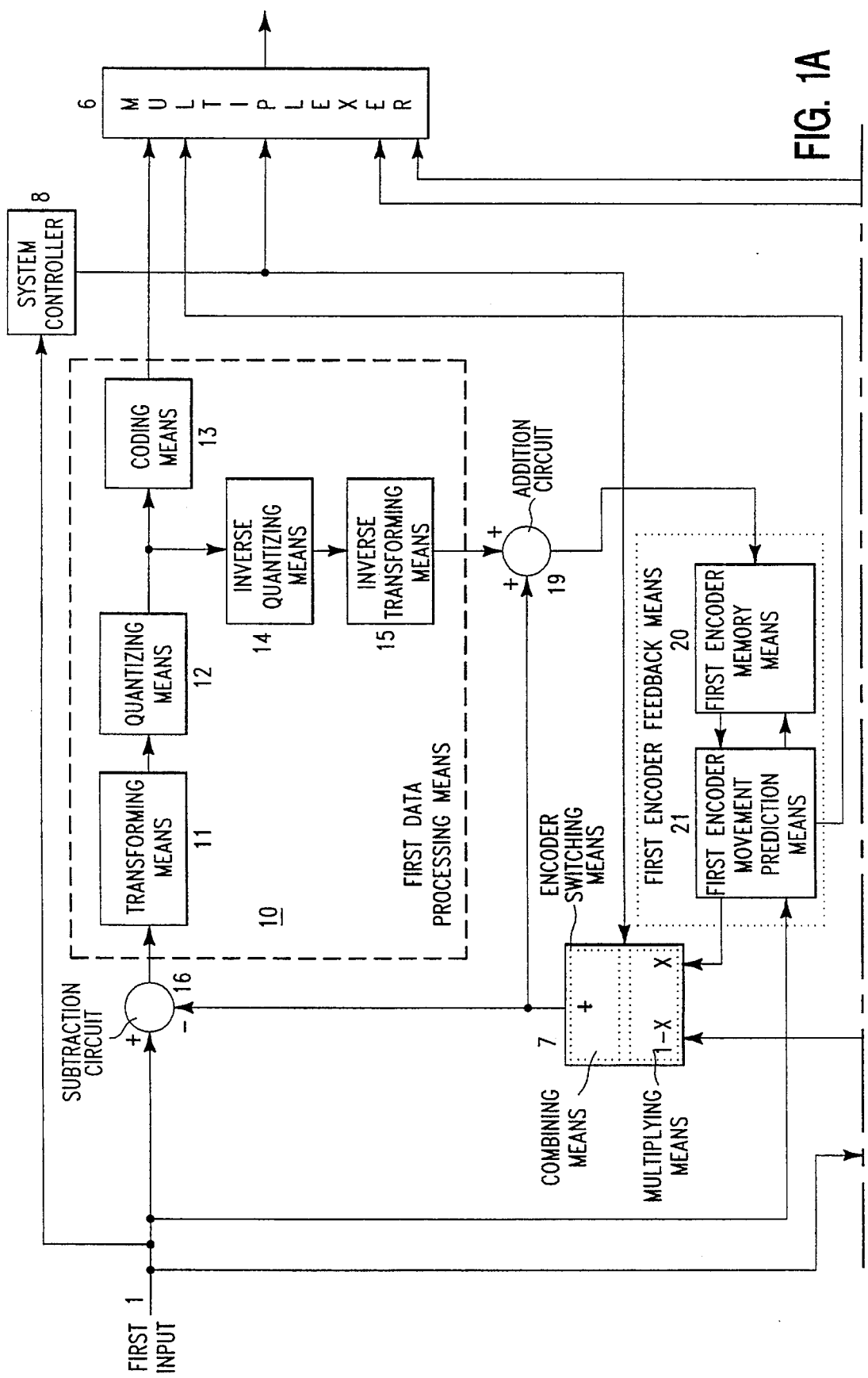
FIGS. 1A and 1B shows two coupled encoders according to the invention.
Figures 1, 1A, 1B:
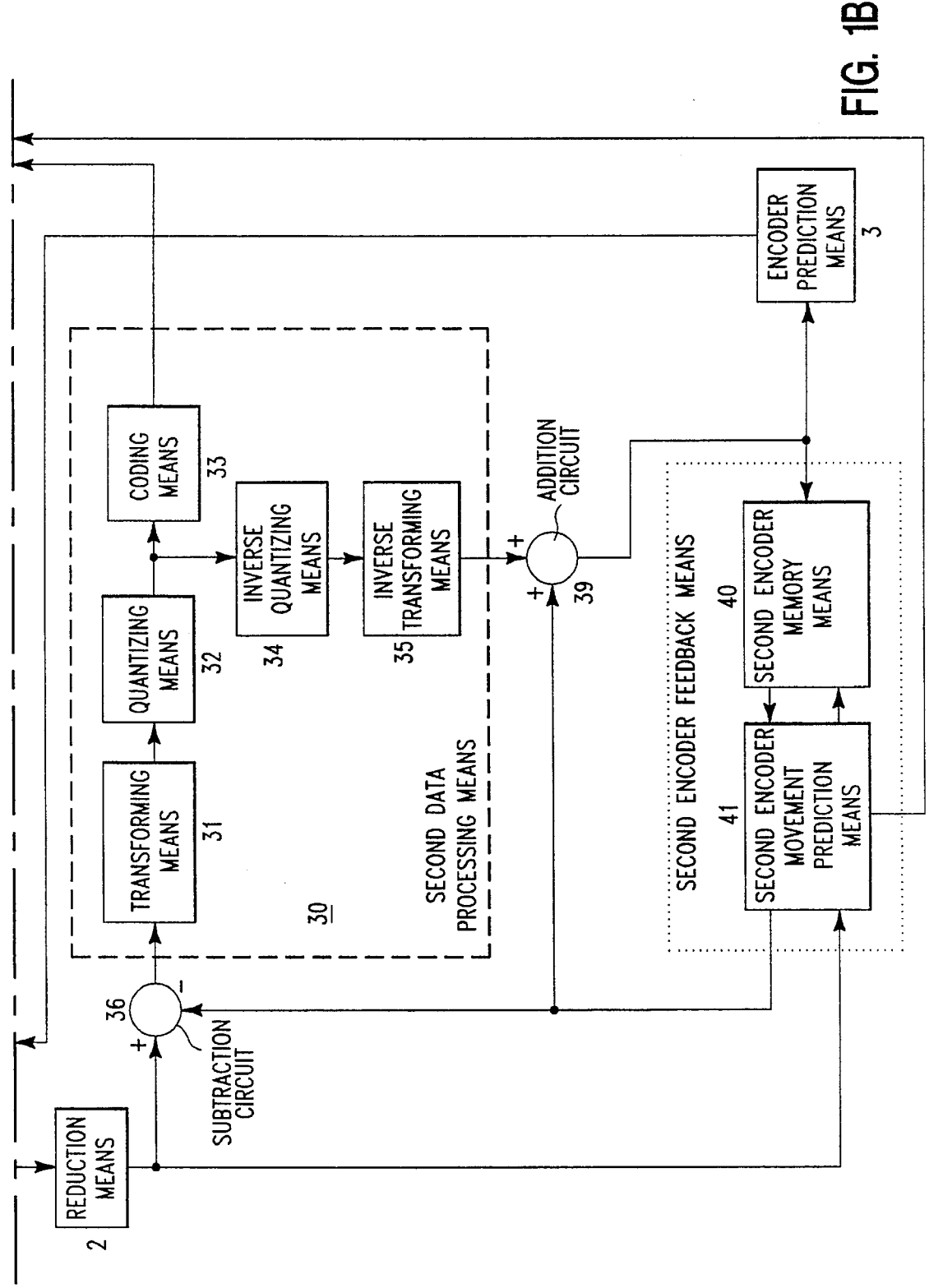
FIG. 1 shows the correct alignment of the drawing sheets for FIGS. 1A and 1B.

The coupled encoders shown in FIGS. 1A and 1B comprise a first encoder (1,3,7,10,11,12,13,14,15,16,19,20,21), which codes first digital signals (left-hand television pictures) present at first input 1, and a second encoder (2,30, 31,32,33,34,35,36,39,40,41), which codes second digital signals (right-hand television pictures) present at second input 2.

The first encoder comprises first dam processing means 10, which are made up of a series connection of transforming means 11, quantizing means 12 and coding means 13 and of a series connection, coupled to a branching point situated between the quantizing means 12 and the coding means 13, of inverse quantizing means 14 and inverse transforming means 15. An input of transforming means 11 forms an input of data processing means 10, which is coupled to an output of subtraction circuit 16. An output of coding means 13 forms a coding output of data processing means 10 for generating a first coded digital signal which is representative of the left-hand television picture, which coding output is coupled to a first input of a multiplexer 6. An output of inverse transforming means 15 forms a feedback output of data processing means 10 for feeding back (at least partly) said data processing means 10, which feedback output is coupled to a first (plus) input of addition circuit 19. An output of addition circuit 19 is coupled to an input of first encoder memory means 20. The latter are bidirectionally coupled to first encoder movement prediction means 21, of which a vector output is coupled to a second input of multiplexer 6 for the generation of a first vector signal. An input of encoder movement prediction means 21 is coupled to the first input 1 of the encoder, which first input 1 is furthermore coupled to a first input of encoder prediction means 3 and to a first (plus) input of subtraction circuit 16. A second (minus) input of the latter is coupled to a second (plus) input of addition circuit 19 and to an output (a main contact) of encoder switching means 7, of which a first input (a first switch contact) is coupled to a further output of encoder movement prediction means 21. A control input of encoder switching means 7 is coupled to a fifth input of multiplexer 6 and to an output of a system controller 8, of which an input is coupled to the coding output of data processing means 10. The system controller 8 passes an x signal, which represents the value of x, to the encoder switching means 7 and to the multiplexer 6, which then passes the x signal to the decoder in multiplexed form. Encoder switching means 7 are designed for the adjustment of the ratio of the signals present at the first input and second input by multiplying the signal present at the first input (originating from the first encoder movement prediction means) by the value x and by multiplying the signal present at the second input (originating from the encoder prediction means 3) by the value 1–x, and by then adding the two signals obtained in this way. For the value x, it holds true that $0 \leq x \leq 1$, which value is determined, in a manner which comes up for consideration later, by the system controller 8 and is adjusted via the control input of encoder switching means 7. An output of encoder prediction means 3 is coupled to a second input (a second switch contact) of encoder switching means 7 and a vector output of encoder prediction means 3 is coupled to a sixth input of multiplexer 6. Encoder prediction means 3 comprise a picture estimator and compensator (disparity estimator and compensator). The first encoder memory means 20 and the first encoder movement prediction means 21 together form the first encoder feedback means.

The second encoder comprises second data processing means 30 which are made up of a series connection of transforming means 31, quantizing means 32 and coding means 33 and of a series connection, coupled to a branching point situated between the quantizing means 32 and coding means 33, of inverse quantizing means 34 and inverse transforming means 35. An input of transforming means 31 forms an input of data processing means 30, which is coupled to an output of subtraction circuit 36. An output of coding means 33 forms a coding output of data processing means 30 for the generation of a second coded digital signal representing the right-hand television picture, which coding output is coupled to a third input of a multiplexer 6. An output of inverse transforming means 35 forms a feedback output of data processing means 30 for feeding back (at least partly) said data processing means 30, which feedback output is coupled to a first (plus) input of addition circuit 39. An output of addition circuit 39 is coupled to an input of second encoder memory means 40. The latter are bidirectionally coupled to second encoder movement prediction means 41, of which a vector input is coupled to a fourth input of multiplexer 6 for the generation of a second vector signal. An input of encoder movement prediction means 41 is coupled to the second input 2 of the second encoder, which second input 2 is furthermore coupled to a first (plus) input of subtraction circuit 36. A second (minus) input of the latter is coupled to a further output of encoder movement prediction means 41, which further output is furthermore coupled to a second (plus) input of addition circuit 39. The output of addition circuit 39 is furthermore coupled to a second input of encoder prediction means 3 for coupling data processing means 30 to data processing means 10. In this arrangement, the second encoder memory means 40 and the second encoder movement prediction means 41 together form the second encoder feedback means.

The operation of the encoders shown in FIGS. 1A and 1B is as follows. The first digital signal to be coded, which represents the left-hand television picture, is presented as bit stream to first input 1, a predetermined number of bits forming a picture element (pixel or pel) in each case. Assuming that the encoder switching means are adjusted with x=1 and that the content of the first encoder memory means 20 is blank, a first group of pels reaches the data processing means 10 via subtraction circuit 16. The transforming means 11 perform, for example, a discrete cosine transformation on the group of pels, which determines the associated coefficient for each frequency component. The quantizing means 12 quantize the signal obtained. The quantized signal is then coded by coding means 13, for example on the basis of a two-dimensional table with which new code words, which have on average a shorter length than the incoming words, are generated and fed to multiplexer 6. This transformed, quantized and coded first group of pels consequently forms the first section of the first coded signal. After having been transformed and quantized, the first group of pels is inversely quantized by inverse quantizing means 14 and inversely transformed by inversely transforming means 15, and stored via addition circuits 19 in encoder memory means 20 at a first location. A second group of pels traverses the same route as the first group of pels, undergoes the same processing and is stored in encoder memory means 20 at a second location, etc., until all the groups of pels of a complete left-hand picture (the first left-hand picture) have been stored.

The first group of pels of the next (second) left-hand picture is then presented to first input 1 and fed to encoder movement prediction means 21 which, on the basis of the preceding (first) picture stored in the encoder memory means 20, investigate whether there is a possibility of a particular movement. If this is so, said movement is fed to multiplexer 6 in the form of the first vector signal. At the same time, encoder memory means 20 generate the first group of pels of the preceding (first) picture, which first group of pels is subtracted, via encoder movement prediction means 21 and via encoder switching means 7 (because this is adjusted with x=1) from the first group of pels of the (second) picture to be coded by means of subtraction circuit 16. Because the difference between the first group of pels of the second picture and the first group of pels of the first picture is then presented to the data processing means 10, the coding proceeds appreciably more efficiently. Taking account of any movements in the picture content of subsequent pictures by means of the encoder movement prediction means by a further additional amount increases the efficiency. Instead of vectors, other prediction parameters which have been determined on the basis of other prediction methods can, of course, be transmitted.

What has been described above is the operation of the first encoder, the encoder switching means 7 being adjusted with x=1. As regards the second encoder, the operation is in principle identical (given the adjustment x=1), with the exception of the following. Data processing means 30 receive via subtraction circuit 36 the second digital signal which is presented at second input 2 and represents the right-hand television picture.

If the encoder switching means 7 are adjusted with x=1, the first group of pels of the preceding (first) picture is subtracted from the first group of pels of the (second) picture to be coded by means of subtraction circuit 16. As a result, a section of the stored preceding left-hand picture is used in order to predict a section of the new left-hand picture to be coded. If the section of the stored preceding left-hand picture is only slightly similar to, or not similar to, the corresponding section of the new left-hand picture to be coded, a decision may be made to base the prediction on a section of the right-hand picture. In this case, the encoder switching means should be adjusted with x=0. If, in the case where x=1, the efficiency of the data processing means was increased because the difference between the first group of pels of the second left-hand picture and the first group of pels of the first left-hand picture only had to be encoded, in the case where x=0, the efficiency of the data processing means 10 is also increased because, as a consequence of the coupling of the second encoder to the first encoder, the difference between the first group of pels of the left-hand picture and the first group of pels of the right-hand picture only has to be encoded. Encoder prediction means 3 are not necessary per se in this arrangement, but, if used, will increase the efficiency further because they already perform a picture estimation and compensation, after which the signal obtained in this manner is fed to the encoder switching means 7.

Both types of predictions are combined if a value between 0 and 1 is chosen for x. If x=½, both types of predictions weigh equally heavily. If x<½, the prediction based on the right-hand picture weighs more heavily, and if x>½, the prediction based on the right-hand picture weighs more heavily. The optimum value of x is determined by the system controller g, which investigates, for example for every possible value of x, how many bits are needed at the coding output of the data processing means 10 in order to reproduce a coded section of a picture. The value of x which requires the least bits is in this case the optimum value. The input of the system controller 8 could also be coupled to the output of subtraction circuit 16, in which case the square of the result signal (difference signal or error signal) present at this output should be calculated for each value of x. The value of x which yields the smallest error is then the optimum value.

Both encoders can each be provided, of course, with different layers, in which case the signal coded in the "highest" layer of an encoder and having a high resolution is suitable, for example, for reproducing so-called high-definition television pictures and the signal coded in the "lower" layer of an encoder and having a low resolution is suitable for reproducing normal television pictures. If each encoder has three layers, signals could be coded with the third ("lowest") layer for reproducing, for example, pictures of so-called video telephone, in which case a still lower resolution may suffice.

Figure 2:
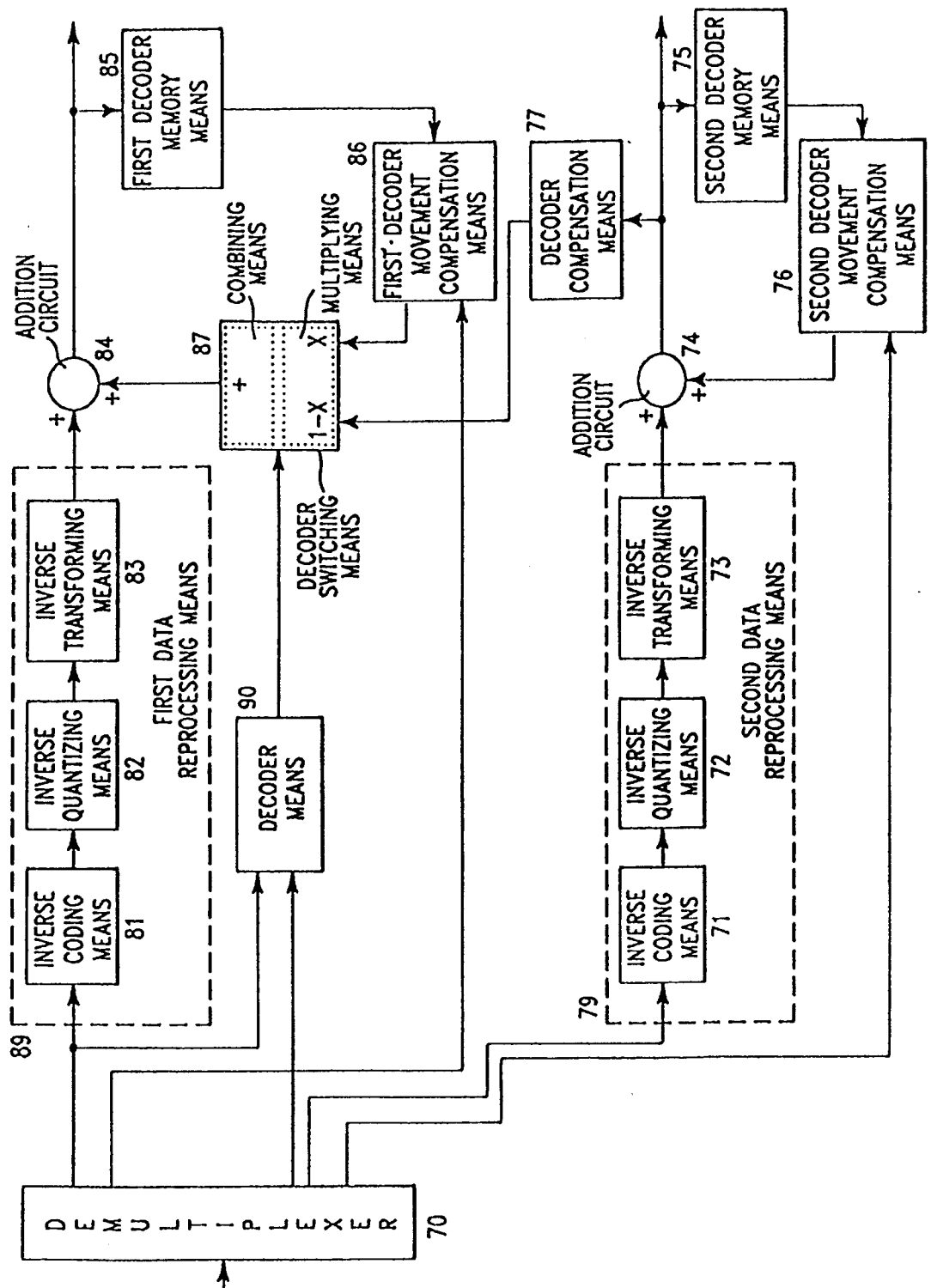
FIG. 2 shows a decoder according to the invention.

The decoder shown in FIG. 2 comprises a demultiplexer 70 having an input for receiving the multiplexed signal which originates from the encoder and comprises the first coded digital signal, the first vector signal, the second coded digital signal, the second vector signal, the x signal and the third vector signal (originating from the encoder prediction means 3). At a first output of demultiplexer 70 there appears the first coded digital signal, at a second output of demultiplexer 70 there appears the first vector signal, at a third output of demultiplexer 70 there appears the second coded digital signal, at a fourth output of demultiplexer 70 there appears the second vector signal, at a fifth output of demultiplexer 70 there appears the x signal and at a sixth output there appears the third vector signal. The first output of demultiplexer 70 is coupled to an input of first data reprocessing means 89 which comprise a series connection of inverse coding means 81, inverse quantizing means 82 and inverse transforming means 83, and of which an output is coupled to a first input of addition circuit 84. An output of addition circuit 84 forms a first (left-hand picture) output of the decoder and is coupled to an input of first decoder memory means 85, and an output of the latter is coupled to an input of first decoder movement compensation means 86. A vector input of the latter is coupled to the second output of demultiplexer 70 for the reception of the (first) vector signal and an output is coupled to a first input (a first switch contact) of the decoder switching means 87, of which an output is coupled to a second input of addition circuit 84. A control input of decoder circuit 87 is coupled to the fifth output of demultiplexer 70 for the reception of the x signal.

The third output of demultiplexer 70 is coupled to an input of second data reprocessing means 79, which comprise a series connection of inverse coding means 71, inverse quantizing means 72 and inverse transforming means 73. An output of the latter is connected to a first input of addition circuit 74, of which an output is coupled via decoder compensation means 77, which comprise picture compensation means (disparity compensator), to a second input (a second switch contact) of decoder switching means 87. The output of addition circuit 74, which forms a second (right-hand picture) output of the decoder, is also coupled to an input of second decoder memory means 75, and an output of the latter is coupled to an input of second decoder movement compensation means 76. An output of the latter is coupled to a second input of addition circuit 74 and a vector output is coupled to the fourth output of demultiplexer 70 for the reception of the (second) vector signal. A vector input of decoder compensation means 77 is coupled to the sixth output of demultiplexer 70.

The operation of the decoder shown in FIG. 2 is as follows. First data reprocessing means 89 perform, via inverse coding means 81, an inverse coding on the first coded digital signal, for example based on a table, they then perform, via inverse quantizing means 82, an inverse quantization, and then they perform, via inverse transforming means 83, an inverse transformation, for example an inverse discrete cosine transformation. Second data reprocessing means 79 perform, via inverse coding means 71, an inverse coding on the second coded digital signal, for example based on a table, they then perform, via inverse quantizing means 72, an inverse quantization and then they perform, via inverse transforming means 73, an inverse transformation, for example an inverse discrete cosine transformation. The signal generated by second data processing means 79 corresponds to the right-hand picture and forms the difference between a particular group of pels of a particular right-hand picture and a particular group of pels of a right-hand picture preceding the latter. With the aid of addition circuit 74, second decoder memory means 75 and second decoder movement compensation means 76, the particular group of pels of the particular right-hand picture then appears at the second (right-hand picture) output of the decoder. This signal is provided with compensation with the aid of decoder compensation means 77 (in accordance with the encoder prediction means present in the first encoder), after which it is suitable to be fed to the second input of decoder switching means 87.

The signal generated by first data processing means 89 corresponds to the left-hand picture and forms the difference between a particular group of pels of a particular left-hand picture and a particular group of pels of a picture preceding the latter (the left-hand picture if x=1, the right-hand picture if x=0, or a combination thereof). With the aid of addition circuit 84, first decoder memory means 85, first decoder movement compensation means 86 and decoder switching means 87, the particular group of pels of the particular left-hand picture then appears at the first (left-hand picture) output of the decoder.

Decoder switching means 87 receive, via the fifth output of demultiplexer 70, the x signal, as a result of which the decoder switching means 87 and the encoder switching means 7 are in a synchronous state (read: are adjusted with the same value of x), and this is necessary, of course, for good decoding. The same applies to decoding compensation means 77 which receive, via the sixth output, the third vector signal fed, and which must, of course, perform the same compensation as in the encoder.

Like the encoders, the decoder can also be provided with various layers in order that it can decode at various resolution levels. It is, of course, if desired, also possible to decode, with a decoder which is made up of various layers, at the lowest resolution level or at a higher resolution level, and this can be achieved by making and/or breaking particular connections in the decoder by means of switches, in which case decoder switching means 87 have then to be adjusted in a suitable manner (possibly with a value of x other than that with which the encoder switching means 7 are adjusted).

The use of multiplexer 6 and demultiplexer 70 is, of course, only one embodiment. Thus, for example, it is conceivable in video recorders that the transfer of the signals from the encoder to the decoder takes place via normal individual connections and, furthermore, there are methods other than multiplexing and demultiplexing with which various signals can also be transferred (such as modulation and demodulation techniques).

We claim:

1. An encoder for coding a digital signal, said encoder comprising:

an encoder-input for receiving the digital signal;

data processing means for generating a coded digital signal at a first output of the data processing means and having an input coupled to the encoder-input;

encoder feedback means, having an encoder memory means, for feeding-back at least a portion of the first coded digital signal, wherein an output of the encoder memory means is coupled to the input of the data processing means and an input to the encoder memory means is coupled to a second output of the data processing means; and encoder switching means, positioned between the output of the encoder memory means and the input of the data processing means, for selecting memory means such that an output of the encoder switching means is coupled to the input of the data processing means and a first input to the encoder switching means is coupled to the output of the encoder memory means and a second input to the encoder switching means can be coupled to an output of a further encoder.

2. The encoder according to claim 1 wherein the encoder switching means further comprises:

encoder combining means for adjusting a ratio of signals present at the first and second inputs to the encoder switching means so as to yield adjusted signals and combining the adjusted signals to form a combined signal and applying the combined signal to the output of the encoder switching means.

3. The encoder according to claim 2 wherein the encoder switching means further comprises:

encoder multiplying means for multiplying the signal present at the first input to the encoder switching means by a value X and multiplies the signal present at the second input to the encoder switching means by a value 1–X, where $0 \leq X \leq 1$, so as to generate the adjusted signals.

4. The encoder according to claim 2 wherein the encoder comprises:

encoder prediction means for generating an encoder prediction signal positioned between the further encoder and the second input to the encoder switching means, such that an output of the encoder prediction means presents the encoder prediction signal and is coupled to the second input of the encoder switching means, a first input to the encoder prediction means is coupled to the encoder-input and a second input to the encoder prediction means can be coupled to the output of the further encoder.

5. The encoder according to claim 4 wherein the encoder comprises:

encoder movement prediction means, positioned between the encoder memory means and the first input to the encoder switching means, for generating vector signals such that an output of the encoder movement prediction means is coupled to the first input of the encoder switching means and an input to the encoder movement prediction means is coupled to the output of the encoder memory means.

6. The encoder according to claim 1 wherein the encoder further comprises:

encoder prediction means for generating an encoder prediction signal, positioned between the further encoder and the second input to the encoder switching means, such that an output of the encoder prediction means presents the encoder prediction signal and is coupled to the second input of the encoder switching means, a first input to the encoder prediction means is coupled to the encoder-input and a second input to the encoder prediction means can be coupled to the output of the further encoder.

7. The encoder according to claim 6 wherein the encoder further comprises:

encoder movement prediction means, positioned between the encoder memory means and the first input to the encoder switching means, for generating vector signals such that an output of the encoder movement prediction means is coupled to the first input to the encoder switching means and an input to the encoder movement prediction means is coupled to the output of the encoder memory means.

8. A decoder for decoding a coded digital signal, comprising:

first data reprocessing means for processing a first coded digital signal;

first decoder memory means coupled to the first data reprocessing means;

second data reprocessing means for processing a second coded digital signal; and second decoder memory means coupled to the second data reprocessor, and decoder switching means for selecting memory means, of which an output of the decoder switching means is coupled to the first data reprocessing means, a first input to the decoder switching means is coupled to an output of the first decoder memory means and a second input to the decoder switching means is coupled to the second data reprocessing means.

9. The decoder according to claim 8 wherein the decoder switching means further comprises:

decoder combining means for adjusting a ratio of signals present at the first and second inputs to the decoder switching means so as to yield adjusted signals and combining the adjusted signals to form a combined signal and applying the combined signal to the output of the decoder switching means.

10. The decoder according to claim 9 wherein the decoder switching means further comprises:

decoder multiplying means for multiplying the signal present at the first input to the decoder switching means by a value X and multiplying the signal present at the second input to the decoder switching means by a value of 1–X, where $0 \leq X \leq 1$, so as to generate the adjusted signals.

11. The decoder according to claim 9 wherein the decoder further comprises:

decoder compensation means, positioned between the second input to the decoder switching means and the second data reprocessing means, for generating a decoder compensation signal such that an output of the decoder compensation means is coupled to the second input of the decoder switching means and an input to the decoder switching means is coupled to the second data reprocessing means.

12. The decoder according to claim 11 wherein the decoder further comprises:

first decoder movement compensation means, positioned between the first decoder memory means and the first input to the decoder switching means, for generating a first decoder movement compensation signal, such that an output of the first decoder movement compensation means is coupled to the first input of the decoder switching means and an input to the first decoder movement compensation means is coupled to the output of the first decoder memory means; and second decoder movement compensation means for generating a second decoder movement compensation signal, positioned between the second decoder memory means and the second data reprocessing means, of which an output of the second decoder movement compensation means is coupled to the second data reprocessing means and of which an input to the second decoder movement compensation means is coupled to the output of the second decoder memory means.

13. The decoder according to claim 8 wherein the decoder further comprises:

decoder compensation means, positioned between the second input of the decoder switching means and the second data reprocessing means, for generating a decoder compensation signal such that an output of the decoder compensation means is coupled to the second input of the decoder switching means and an input to the decoder switching means is coupled to the second data reprocessing means.

14. The decoder according to claim 13 wherein the decoder further comprises:

first decoder movement compensation means, positioned between the first decoder memory means and the first input to the decoder switching means, for generating a first decoder movement compensation signal, such that an output of the first decoder movement compensation means is coupled to the first input of the decoder switching means and an input to the first decoder movement compensation means is coupled to the output of the first decoder memory means; and second decoder movement compensation means, positioned between the second decoder memory means and the second data reprocessing means, for generating a second decoder movement compensation signal, such that an output of the second decoder movement compensation means is coupled to the second data reprocessing means and an input to the second decoder movement compensation means is coupled to the output of the second decoder memory means.

15. A system for communicating a digital signal comprising a first encoder for coding a first digital signal, a second encoder for coding a second digital signal and at least one decoder for decoding coded digital signals wherein said first encoder comprises:
an encoder-input for receiving the first digital signal;
first data processing means for generating a first coded digital signal at a first output of the first data processing means data processing and having an input coupled to the encoder-input; and
first encoder feedback means, having a first encoder memory means, for feeding-back at least a portion of the first coded digital signal such that an output of the first encoder memory means is coupled to the input of the first data processing means and an input to the first encoder memory means is coupled to a second output of the first data processing means; and wherein said second encoder comprises:
an encoder-input for receiving the second digital signal;
second data processing means for generating a second coded digital signal at a first output of the second data processing means and having an input coupled to the encoder-input;
second encoder feedback means, having a second encoder memory means, for feeding-back at least a portion of the second coded digital signal such that an output of the second encoder memory means is coupled to the input of the second data processing means and an input to the second encoder memory means is coupled to a second output of the second data processing means; and wherein said decoder comprises:
first data reprocessing means for processing the first coded digital signal;
first decoder memory means coupled to the first data reprocessing means;
second data reprocessing means for processing the second coded digital signal; and
second decoder memory means coupled to the second data reprocessing means;

wherein the first encoder further comprises:
encoder switching means, positioned between the output of the first encoder memory means and the input of the first data processing means, for selecting memory means, such that an output of the encoder switching means is coupled to the input of the first data processing means, a first input to the encoder switching means is coupled to the output of the first encoder memory means, and a second input to the encoder switching means is coupled to the second output of the second data processing means; and wherein the decoder further comprises:
decoder switching means for selecting memory means, such that an output of the decoder switching means is coupled to the first data reprocessing means, a first input to the decoder switching means is coupled to an output of the first decoder memory means, and a second input to the decoder switching means is coupled to the second data reprocessing means.

16. The system according to claim 15 wherein the encoder switching means further comprises:

encoder combining means for adjusting a ratio of signals present at the first and second inputs to the encoder switching means so as to yield adjusted signals, combining the adjusted signals to form a combined signal and applying the combined signal to the output of the encoder switching means, and wherein the decoder switching means further comprises decoder combining means for adjusting a ratio of the signals present at the first and second inputs to the decoder switching means so as to yield adjusted signals, combining the adjusted signals to form a combined signal and applying the combined signal to the output of the decoder switch.

17. The system according to claim 16 wherein the encoder switching means further comprises:

encoder multiplying means for multiplying the signal present at the first input to the encoder switching means by a value X and multiplying the signal present at the second input to the encoder switching means by a value 1–X, where $0 \leq X \leq 1$ so as to generate the adjusted signals, and wherein the decoder switching means further comprises decoder multiplying means for multiplying the signal present at the first input to the decoder switching means by a value X and multiplying the signal present at the second input to the decoder switching means by a value 1–X, where $0 \leq X \leq 1$, so as to generate the adjusted signals.

* * * * *